(12) United States Patent  
Sullivan et al.

(10) Patent No.: US 6,695,738 B2
(45) Date of Patent: Feb. 24, 2004

(54) INVERTED PORTAL AXLE ROTATING SPINDLE WHEEL END

(75) Inventors: William C. Sullivan, Newark, OH (US); Tomaz Dopico Varela, Gahanna, OH (US)

(73) Assignee: Meritor Heavy Vehicle Technology LLC, Troy, MI (US)

( * ) Notice: Subject to any disclaimer, the term of this patent is extended or adjusted under 35 U.S.C. 154(b) by 0 days.

(21) Appl. No.: 10/150,027

(22) Filed: May 17, 2002

(65) Prior Publication Data

US 2003/0216210 A1 Nov. 20, 2003

(51) Int. Cl.[7] .............................................. F16H 48/06
(52) U.S. Cl. ........................................ 475/222; 475/343
(58) Field of Search ................................. 475/222, 343, 475/221; 180/371, 372, 385

(56) References Cited

U.S. PATENT DOCUMENTS

| | | | | | |
|---|---|---|---|---|---|
| 3,518,897 A | * | 7/1970 | Bixby | ......................... | 475/222 |
| 3,862,667 A | * | 1/1975 | Wolansky | ..................... | 180/371 |
| 4,114,479 A | * | 9/1978 | Ashfield | ...................... | 475/343 |
| 4,158,971 A | * | 6/1979 | Szalai et al. | ................. | 475/343 |
| 4,392,396 A | * | 7/1983 | Sato et al. | ................... | 475/343 |
| 4,574,658 A | * | 3/1986 | Abbott et al. | ................ | 475/343 |
| 5,674,148 A | * | 10/1997 | Bouteille | ..................... | 475/343 |
| 6,095,005 A | * | 8/2000 | Tanzer et al. | ................ | 180/371 |

* cited by examiner

Primary Examiner—Dirk Wright
(74) Attorney, Agent, or Firm—Carlson, Gaskey & Olds

(57) ABSTRACT

An offset axle assembly includes a two-piece gear case. A first section of the gear case includes a drive gear assembly and the second section includes a driven gear attached to a shaft supported within the second section of the gear case. Attached to the end of the shaft is a hub. The hub is attached to the shaft by way of a plurality of mating splines. The hub is secured to the end of the shaft by a single nut. The hub may be removed from the shaft by removal of the single nut. One of the drive gear or driven gear assemblies is a planetary gear system. The planetary gear system includes a ring gear driven by a helical gear such that distance between axles is determined by the diameters of the helical and ring gear.

20 Claims, 5 Drawing Sheets

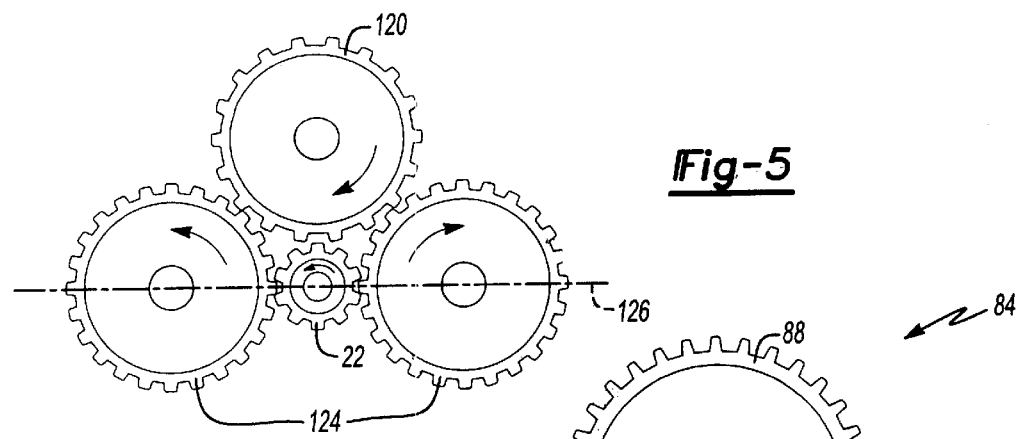
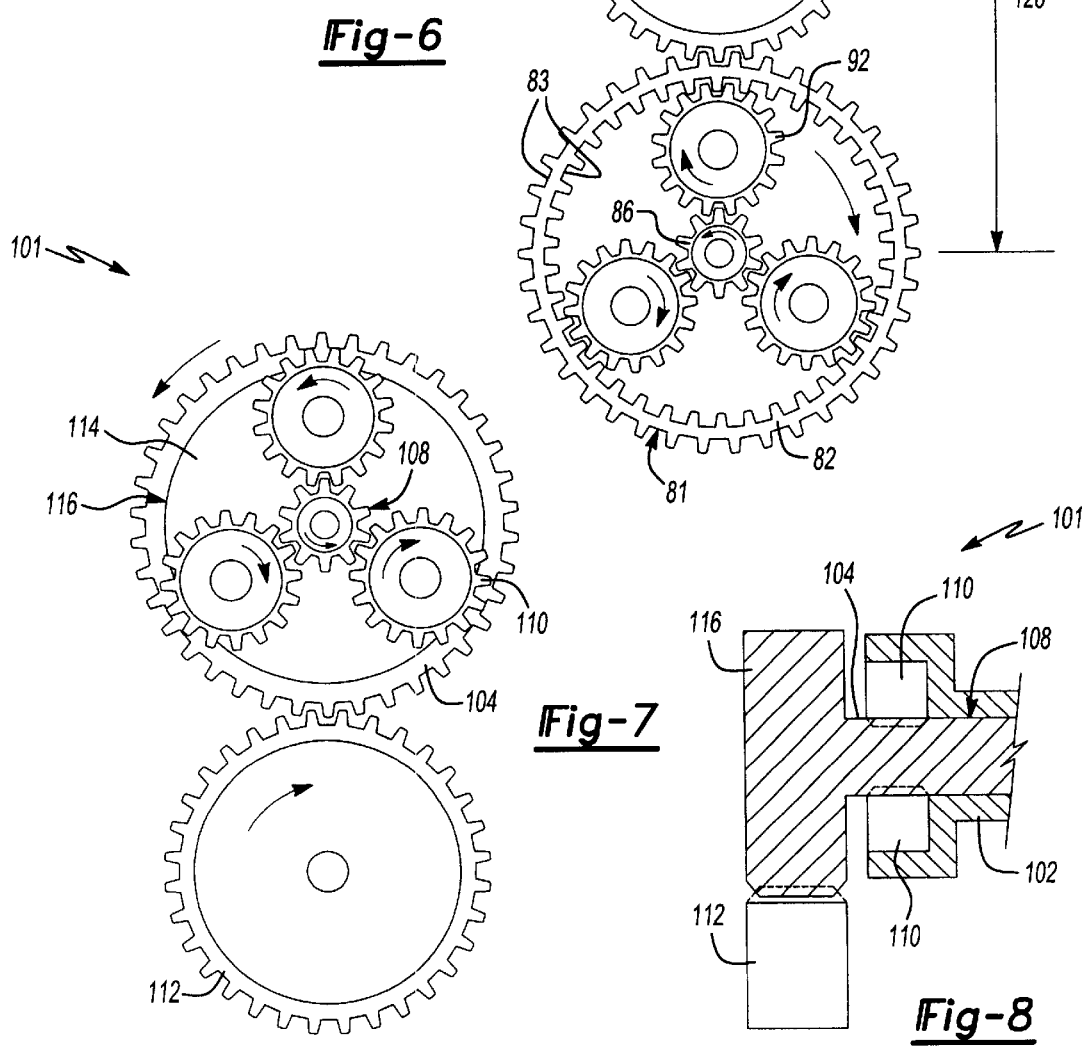

INVERTED PORTAL AXLE ROTATING SPINDLE WHEEL END

BACKGROUND OF THE INVENTION

This invention relates generally to an offset axle assembly and specifically to an offset axle assembly that allows greater distance between axles.

Typically, an offset axle is used to provide an offset distance between a drive axle and the wheel centerline. In some applications, the drive axle is positioned above the wheel centerline to provide increased ground clearance. In other applications, the drive axle is positioned below the wheel centerline to provide for a lower floor. The lower floor is typically used in public transportation vehicles such as large buses. By placing the drive shaft significantly lower than the wheel centerline the floor of the bus can be significantly lowered to improve ingress and egress from the vehicle.

Offset axles are typically configured to include a drive gear and a driven gear. The driven gear drives an axle, which in turn drives the wheels. The drive gear assembly typically includes a drive gear driven by a shaft through a differential assembly. The drive gear drives a pair of idler gears that in turn drive the driven gear. The idler gears provide direction reversal and speed reduction.

A conventional offset axle assembly is shown in prior art FIG. 1. The prior art offset axle 10 includes a gear case housing 12 that supports the drive gear 14 that drives the driven gear 15 and shaft 16. The shaft 16 is suspended between the driven gear 15 and a hub 26. Bearing assemblies 34 supports the driven gear 15. Additional bearing assemblies 34 support the hub 26. In this configuration, the shaft 16 extends through a spindle 20 bolted to the gear case 12. The shaft 16 attaches on one end to the driven gear 15 and to another end to the hub 26. The hub 26 is in turn supported for rotation about the spindle 20 by the bearing assemblies 34. Attached to the hub 26 is the drum 24. The drum 24 cooperates with the brake shoes 30 to provide braking force. To support the brake shoes 30 a separate brake support 22 is mounted to the gear case 12 separate of the spindle 20. The brake support 22 includes a brake support lug 28 supporting the brake shoes 30.

In operation, power transmitted through the differential assembly 32 drives the drive gear 14 which drives the driven gear 15 rotating the shaft 16 and hub 26. For any maintenance to be accomplished on the brake assembly such as changing shoes 30, the hub must be removed to service the brakes 30. Removal of the hub 26 requires that a total of 68 screws be removed in order to service both wheel ends of the offset axle 10. This is very labor intensive and discourages frequent maintenance of the brake shoes 30. Further, the offset axle assembly shown at 10 includes additional bearing assemblies 34 to support the hub 26 along with the gear 15. As appreciated, reducing the number of bearing assemblies is desirable to reduce maintenance and decrease manufacturing costs.

Accordingly, it is desired to develop a simplified offset axle assembly that reduces the number of bearing assemblies and eases routine maintenance and increases feasible offset distances between axles.

SUMMARY OF THE INVENTION

An embodiment of this invention is a two-piece gear case housing supporting a driven gear, shaft, hub and including an integral brake support structure to simplify construction and maintenance.

An embodiment of this invention includes a gear case housing comprised of two pieces. The first piece encloses a differential assembly along with the drive gear assembly. The second portion of the gear case includes a cavity with two bearing assemblies to support rotation of the driven shaft along with the driven gear and hub. The driven gear is attached to the driven shaft and rotationally supported within a cavity of the second half of the gear case. The shaft includes a spline onto which a hub is installed. The hub is secured to the shaft by a single nut engaging threads on the shaft.

An outer portion of the second gear case housing includes a brake shoe support lug. The brake shoe support lug eliminates the need for a separate brake support structure currently part of conventional offset axle configurations. The two-part gear case eases maintenance of the brake system by simplifying removal of the hub with a single nut securing the hub to the shaft.

The offset axle of this invention includes two bearing assemblies disposed within the cavity defined by the second half of the gear case. The two bearing assemblies support the driven gear, the driven axle along with the hub. This reduces the number of bearing assemblies from four in conventionally configured offset axle assemblies to two. As appreciated, reduction of bearing assemblies required to support rotating components decreases cost of the overall axle assembly and improves durability and operation.

Another embodiment of this invention includes a drive gear assembly comprising a planetary gear system. The planetary gear system includes a ring gear having gear teeth positioned on an inner circumference and an outer circumference. The driven gear is positioned at a center point within the ring gear to drive a plurality of planetary gears. The planetary gears in turn rotate the ring gear, which in turn drives the driven gear. This configuration provides for an increase in the distance between the drive axle and the driven axle.

Still another embodiment of this invention is a driven gear assembly comprising a planetary gear system driven by a helical drive gear. A helical driven gear is suspended for rotation by a pair of bearing assemblies disposed at each end of a helical gear. The helical gear includes a driven portion engaged with the drive gear and a shaft portion engaged with planetary gears disposed within a ring gear. The ring gear of this assembly is integral to the shaft. In operation, the helical drive gear drives the helical driven gear portion, which in turn rotates the shaft portion of the helical gear, engaged through the planetary gears of the planetary gear system. The planetary gear system in turn engages gear teeth disposed on an inner surface of the ring gear integral to the shaft. This configuration allows for increased offset distances between the drive axle and the driven axle to improve ground clearance or further lower the floor of a transportation vehicle.

Accordingly, embodiments of this invention provide an improved and more efficient offset drive axle assembly allowing greater offset distances between axles while easing maintenance.

BRIEF DESCRIPTION OF THE DRAWINGS

FIG. 5 is a schematic view of a prior art drive, driven gear assembly;

FIG. 6 is a schematic view of the driven gear assembly including a planetary gear system;

FIG. 7 is a schematic view of the planetary gear system in the driven gear assembly; and FIG. 8 is a schematic view of the driven gear planetary gear assembly.

DETAILED DESCRIPTION OF A PREFERRED EMBODIMENT

Figure 1:
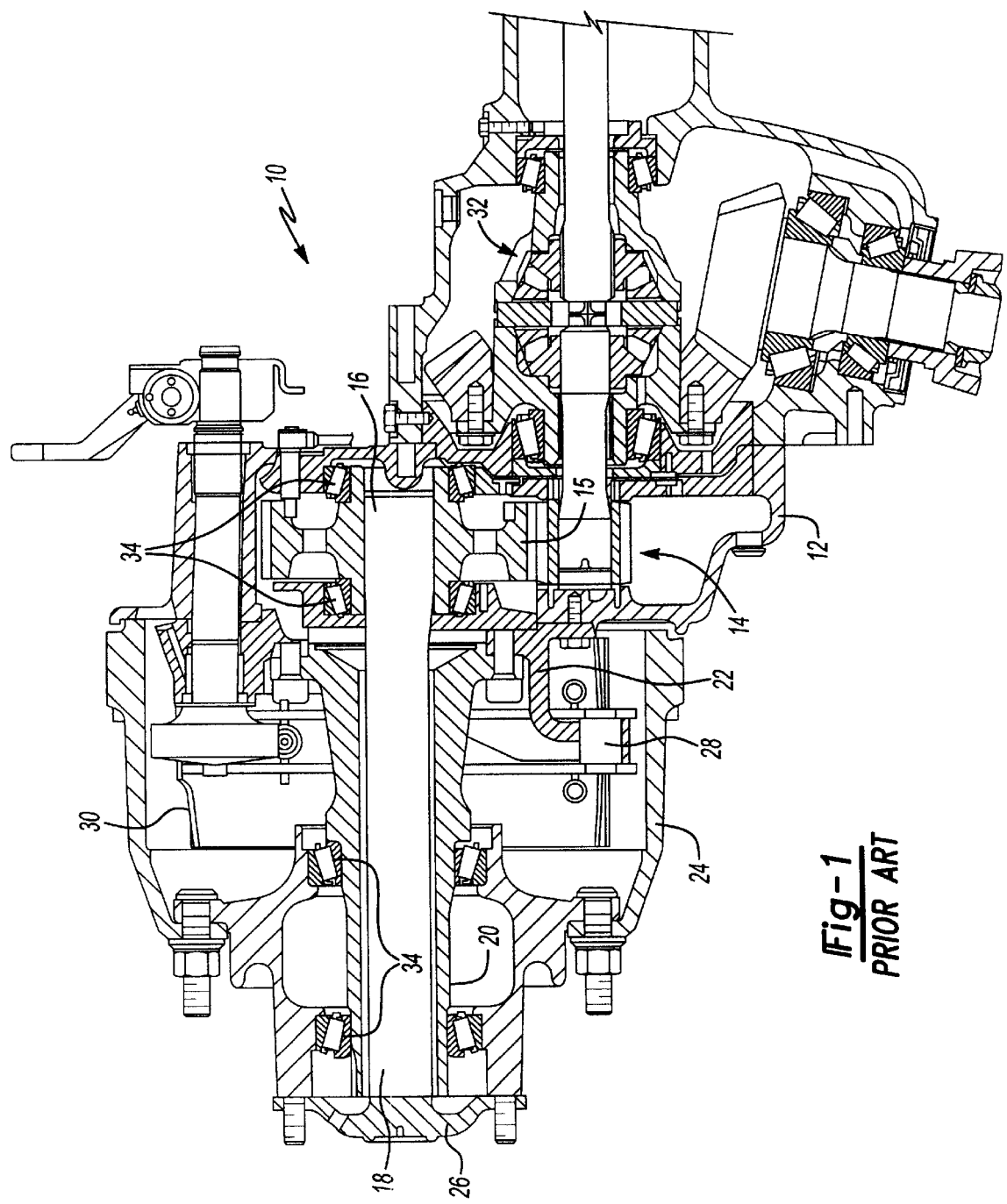
FIG. 1 is a cross-sectional view of a prior art offset axle assemblies.
Figure 2:
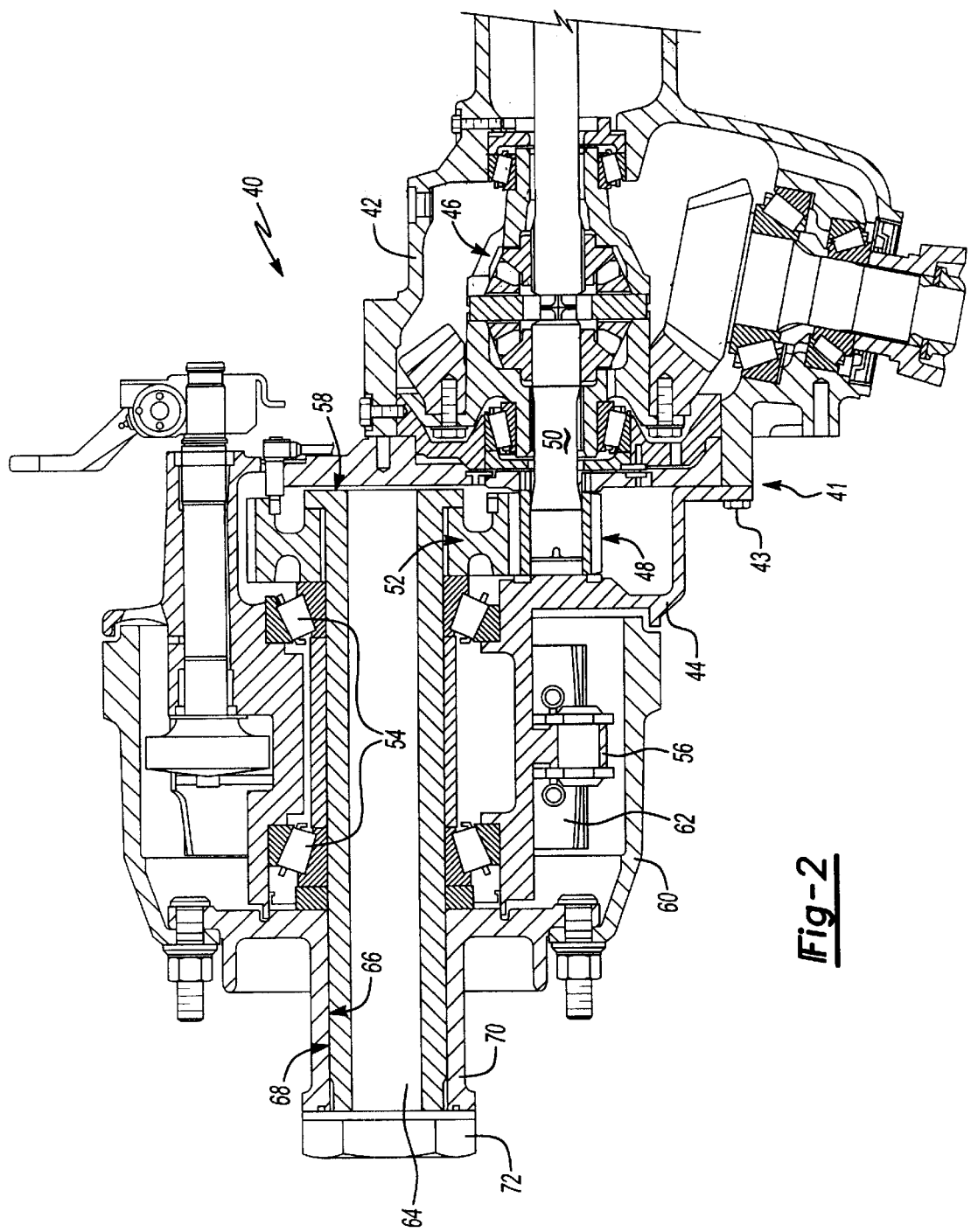
FIG. 2 is a cross-sectional view of the offset axle assembly of this invention.

An embodiment of this invention is shown in FIG. 2 and is an inverted portal axle assembly 40 including a two-piece gear case housing 41. The two-piece gear case housing includes a first piece 42 and a second piece 44. The first piece 42 houses a differential gear assembly 46. The differential gear assembly 46 drives a shaft 50 connected to a drive gear 48. The drive gear 48 drives driven gear 52. The driven gear 52 rotates shaft 64 connected to a hub 70.

The second gear case piece 44 defines an internal cavity 58 supporting two bearing assemblies 54. The bearing assemblies 54 support the shaft 64 along with the driven gear 52 and the hub 70. Drum 60 attaches to the hub 70 by fasteners 61. The shaft 64 includes a splined portion 66 that cooperates with the splined portion 68 of the hub 70. The hub 70 is assembled to the shaft 64 and engaged at mating splined regions 66,68. The hub 70 is secured to the shaft 64 by nut 72. Supporting the shaft 64, driven gear 52 and hub 70 with two bearing assemblies 54 eliminates separate bearing assemblies to support the hub and the driven gear 52 as used in conventional offset axle assemblies.

The outer portion of the second gear case section 44 defines a brake lug portion 56. The brake lug portion 56 of the second gear case section 44 replaces the separate brake support structure required in conventional offset axle configurations. The brake lug 56 supports the brake shoe 62 of the brake assembly 61. This configuration provides for easy replacement and maintenance of the brake assembly 61 by simply removing the nut 72 to allow the hub 70 to be removed from the shaft 64. Conventional offset axle assemblies require removal of multiple cap screws in order to gain access to the brake shoe 62. The second gear case 44 is attached to the first gear case 42 by a plurality of fasteners 43. The fasteners 43 need not be removed to access and service the brake assembly 61. The offset axle assembly 40 of this invention requires only the removal a single nut 72 to remove the hub 70, drum 60, and access the brake assembly 61 for service.

Figure 3:
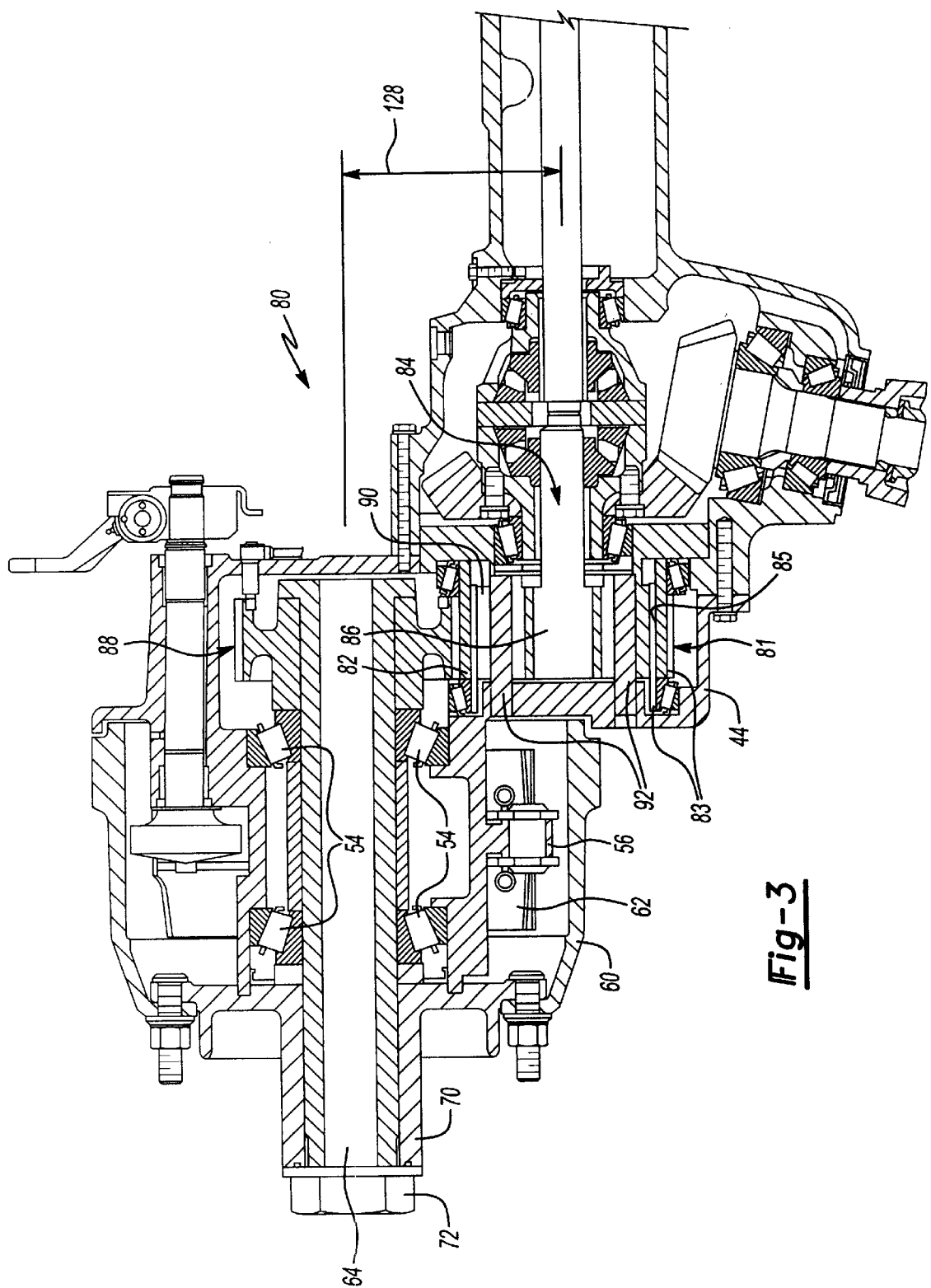
FIG. 3 is a cross-sectional view of an offset axle assembly including a planetary drive gear assembly.

Referring to FIG. 3, another embodiment of this invention is an improved drive gear assembly 84. The drive gear assembly 84 of this embodiment comprises a planetary gear assembly including a helical ring gear 82 driven by a plurality of planetary drive gears 90 which in turn are driven by the drive gear 86. In this embodiment of the drive gear assembly 84, the second portion of the gear case housing 44 houses a helical ring gear 82. The helical ring gear includes outer and inner gear teeth 81, 83. The outer gear teeth 81 engage the driven gear 88. The inner gear teeth 83 engage planetary gears 92. The planetary gears 92 are supported about shafts 92. The driven gear 86 is driven by the differential gear assembly 32 housed in the first half of the housing 42. The offset distance 128 between shafts is determined by the diameter of the ring gear and the driven gear 88. The planetary gear assembly provides the necessary gear reduction and direction reversal previously provided by conventional idler gear configurations.

Referring to FIG. 6, a schematic view of the driven gear assembly 84 planetary gear system. The drive gear 86 rotates in a first direction to drive planetary gears 92 in a second direction. The planetary gears 92 are engaged with the inner gear teeth 81 of the ring gear 82. The outer gear teeth 83 engage gear teeth 78 on the driven gear 88. The offset distance 128 between shafts determined by the diameter of the ring gear 82 and driven gear 88. The specific diameter of the ring gear 82 and driven gear 88 are application specific, and a worker knowledgeable in the art would understand how to configure mating gears for a specific application.

Figure 4:
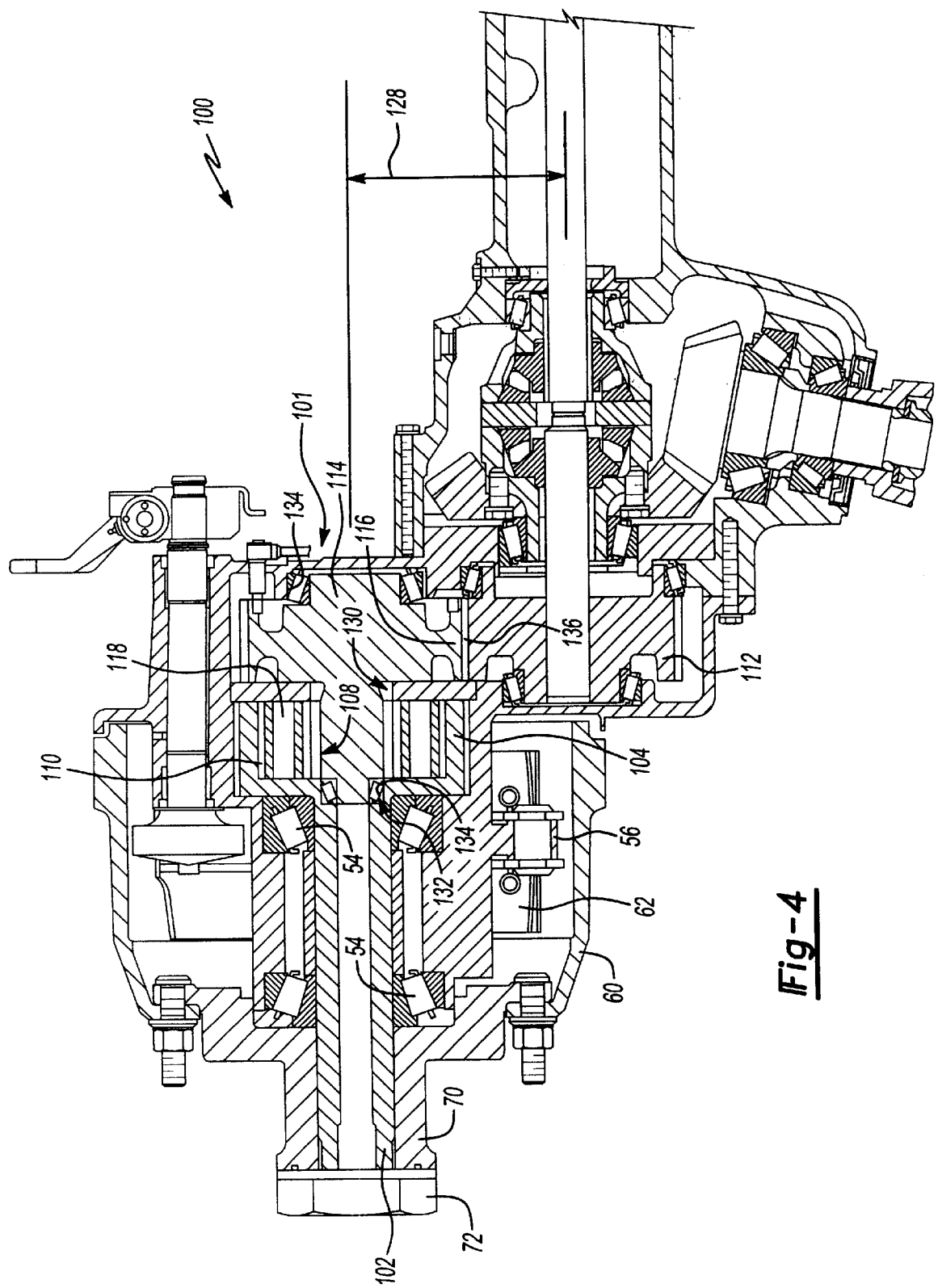
FIG. 4 is a cross-sectional view of a planetary gear driven assembly.

Referring to FIG. 4, an alternate embodiment of the planetary gear drive system is shown where the driven gear assembly 101 is a planetary gear system. The driven gear 112 is a helical gear having a diameter engaged to the driven gear 114 at the desired offset distance 128 between drive axle 98 and shaft 102. In this embodiment, the shaft 102 includes an integral ring gear portion 104. The integral ring gear portion 104 defines cavity 130 containing planetary gears 110 supported on planetary gear axles 118. The shaft 102 is supported for rotation by bearing assemblies 54.

The helical gear 114 is supported for rotation independent of the axle 102 by gear bearing assemblies 134. The first portion of the gear case 42 supports one of the bearing assemblies 134 and the other is supported within a shoulder 132 defined within the shaft 102. The helical gear 114 includes an outer gear portion 116 engaged to the driven gear 112 and a shaft portion 108 to drive the planetary gears 110.

In operation, the driven gear 112 drives the helical gear 114 by engaging gear teeth 136 on the outer helical gear portion 116. The helical gear 114 rotates independent of the shaft 102. The shaft 108 engages planetary gears 110 that rotate in a direction opposite the shaft portion 108 to drive the ring portion 104 of the shaft 102.

Referring to FIGS. 7 and 8, the planetary gear system of the driven gear assembly 101 is schematically shown. The drive gear 112 rotates in a first direction and is in contact with the outer portion of the helical gear 114 on the helical gar portion 116. The shaft portion 108 drives the planetary gears 110. The planetary gears 110 engage the gear teeth 138 of the ring gear 104 to drive the shaft 102.

The planetary gear system of the driven gear assembly 101 shown in FIG. 4 provides for an increased offset distance 128 between the centerlines of the drive axle 98 and the shaft 102. This allows for greater offset distances between the two shafts 98,102 which in turn corresponds to either increased ground clearance or lower floors in public transportation vehicles.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A portal axle assembly comprising;
   a differential assembly including a drive gear assembly supported within a differential housing;
   a driven gear assembly attached to rotate a shaft and transmit rotation from said drive gear of said differential assembly;
   a gear case attached to said differential housing defining a cavity through which said shaft extends;
   two bearing assemblies disposed within said cavity defined by said gear case for supporting said shaft and said driven gear; and
   a hub mounted to said shaft.

2. The assembly of claim 1, wherein an outer surface of said gear case includes a support for mounting a brake shoe.

3. The assembly of claim 1, wherein said support includes a lug attached to said support for mounting said brake shoe.

4. The assembly of claim 2, wherein a brake drum mounts to said hub.

5. The assembly of claim 3, wherein said hub includes splines corresponding to splines disposed on said shaft.

6. The assembly of claim 5, further including a nut threaded onto an end of said shaft to secure said hub.

7. The assembly of claim 1, wherein said drive gear assembly comprises a planetary gear assembly.

8. The assembly of claim 1, wherein said drive gear assembly includes a helical gear having gear teeth disposed on inner and outer surfaces and planetary gears engaged to gear teeth on said inner surface of said helical gear, and a driven gear engaged to drive said planetary gears.

9. The assembly of claim 1, wherein said driven gear assembly comprises a planetary gear assembly.

10. The assembly of claim 1, wherein said driven gear assembly includes a helical gear driven by said drive gear assembly, said helical gear including a driven gear and a drive pinion gear, said drive pinion gear engaged to drive planetary gears disposed within a ring gear and said ring gear drives said shaft.

11. The assembly of claim 10, wherein said ring gear is an integral portion of said shaft.

12. The assembly of claim 1, wherein said hub mounted to said shaft is removable without removing said gear case from said differential housing.

13. A portal axle assembly comprising;
    a differential assembly including a drive gear supported within a differential housing;
    a gear case attached to said differential assembly;
    a planetary gear assembly supported within said gear case and driven by said drive gear; and
    a shaft supported within said gear case and driven by said planetary gear assembly.

14. The assembly of claim 13, wherein said planetary gear assembly includes a shaft having a ring gear portion.

15. The assembly of claim 14, wherein said planetary gear assembly includes a combination gear, said combination gear includes a helical portion driven by said drive gear and a pinion gear driving planetary gears engaged to drive said ring gear of said shaft.

16. The assembly of claim 15, wherein a bearing assembly disposed within said shaft to support said combination gear for rotation relative to said shaft.

17. A portal axle assembly comprising;
    a differential assembly including a planetary gear assembly supported within a differential housing;
    a gear case attached to said differential assembly;
    a driven gear supported within said gear case and driven by said planetary gear assembly; and
    a shaft supported within said gear case and driven by said planetary gear assembly.

18. The assembly of claim 17, wherein said planetary gear assembly includes a drive gear engaged to planetary gears disposed within a ring gear.

19. The assembly of claim 18, wherein said ring gear includes gear teeth on and inner and outer surface, said gear teeth on said inner surface engaged to said planetary gears, and said gear teeth on said outer surface engaged to drive said driven gear.

20. A portal axle assembly comprising;
    a differential assembly including a drive gear assembly supported within a differential housing;
    a driven gear assembly attached to rotate a shaft and transmit rotation from said drive gear of said differential assembly; and
    a gear case attached to said differential housing supporting said shaft and said driven gear assembly.

* * * * *